March 9, 1965 M. J. H. STAAR 3,172,669

PICK-UP ARM LOCATORS OF AUTOMATIC RECORD CHANGERS

Filed Aug. 28, 1961 5 Sheets-Sheet 1

March 9, 1965 M. J. H. STAAR 3,172,669

PICK-UP ARM LOCATORS OF AUTOMATIC RECORD CHANGERS

Filed Aug. 28, 1961 5 Sheets-Sheet 2

March 9, 1965 M. J. H. STAAR 3,172,669

PICK-UP ARM LOCATORS OF AUTOMATIC RECORD CHANGERS

Filed Aug. 28, 1961 5 Sheets-Sheet 3

March 9, 1965 M. J. H. STAAR 3,172,669

PICK-UP ARM LOCATORS OF AUTOMATIC RECORD CHANGERS

Filed Aug. 28, 1961 5 Sheets-Sheet 5

United States Patent Office 3,172,669

Patented Mar. 9, 1965

3,172,669

PICK-UP ARM LOCATORS OF AUTOMATIC RECORD CHANGERS

Marcel Jules Hélène Staar, 4 Ave. Sylviane, Rhode-Saint-Genese, Belgium

Filed Aug. 28, 1961, Ser. No. 134,438
Claims priority, application Belgium, Aug. 29, 1960, 594,498
4 Claims. (Cl. 274—10)

Figures 1, 1A:
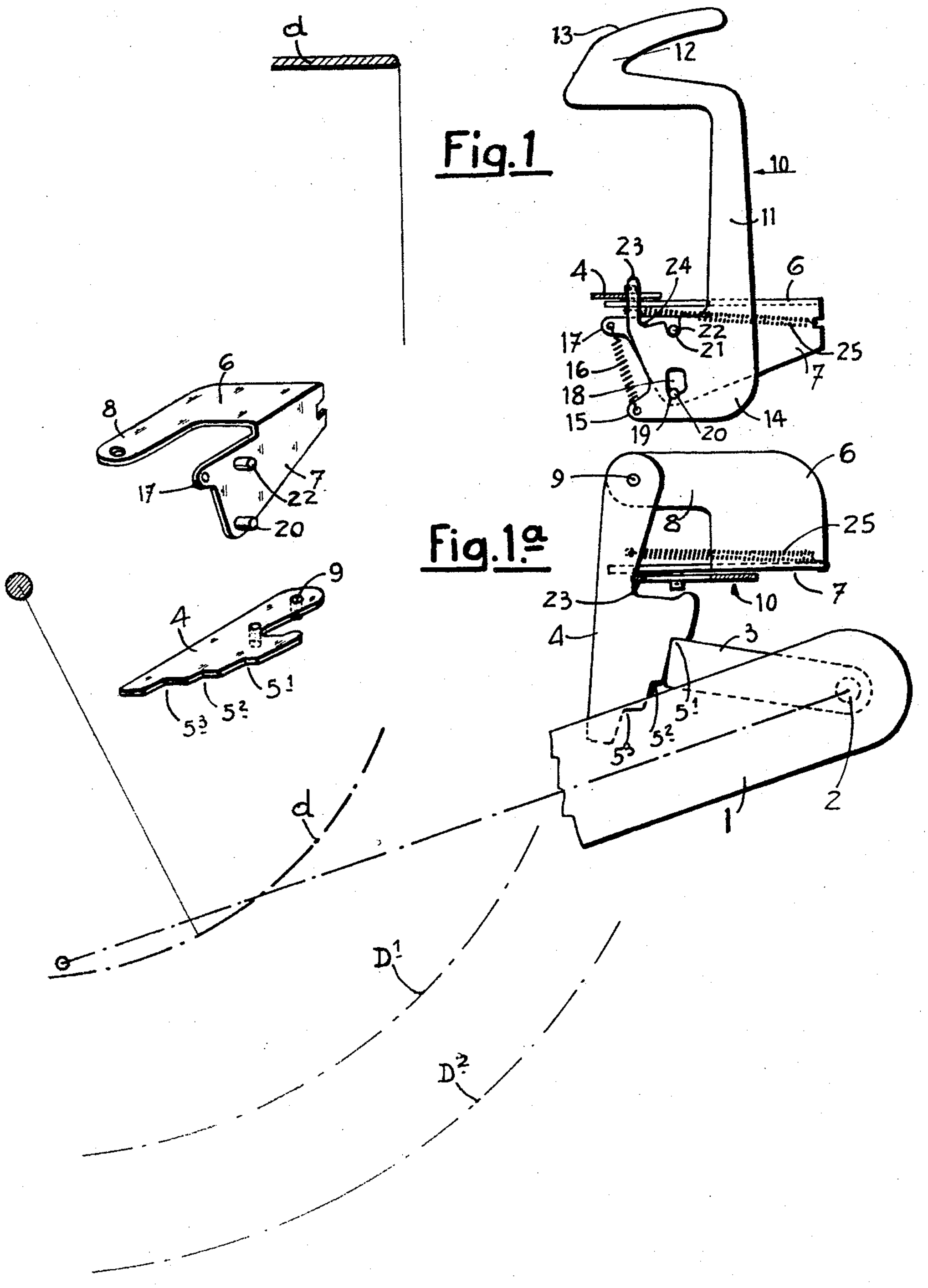

The invention relates to devices for automatically positioning the pick-up arms of record changers in accordance with the size of the records to be played.

It is known to provide means for sensing the diameter of records to be played on a turntable and, for placing the reproducing needle which is in the tone arm into the starting groove of the selected record. At present there are three record diameters in use, namely 7", 10" and 12". Moreover, the means is adapted for operation in whatever the order in which the records drop onto the turntable. There are various ways of achieving this result. The simplest procedure is for a member, one end of which is disposed in the path of the records, with the possible exception of records of the smallest diameter, to be pivoted through a varying distance by the edge of the record when the same has dropped onto the turntable. In this system the smallest-diameter records do not move the sensing member, and so the end position thereof corresponds to the correct placing of the pick-up arm in the starting groove of the smallest-diameter records.

It is a principal object of the invention to detect the differences in diameters of records by causing the records of different size to contact different surfaces of a sensing element to cause different modes of travel of the sensing element.

It is another object of the invention to provide a clearer distinction between the placing of a medium-diameter record and the placing of a large-diameter record on a turntable such that each size record acts differently upon the record diameter sensing mechanism. This system is of the kind comprising a sensing element adapted for being pivoted by the edge of the records, except for the smallest-diameter records, when the same drop onto the turntable. The amplitude of the pivoting movement of the sensing element varies with the record diameter and therefore determines the position of a stop which limits the movement of the pick-up arm to ensure that the same drops correctly into the starting groove of the last record to have dropped onto the turntable.

The main features of the system according to the invention are that means is provided which operate differently for each record diameter to cause the sensing element to take up a position corresponding to the various diameters of the records which have dropped onto the turntable.

In a practical form of the invention, the detecting element is so shaped, and co-operates with stop members and pivoting elements of such a kind, that the large-diameter records can pivot the sensing element into the corresponding position only by a substantially vertical action, whereas the medium-diameter records pivot the sensing element into a position corresponding to the medium-diameter records only by a lateral resultant which does not exist for the large-diameter records.

Figures 2, 2A:
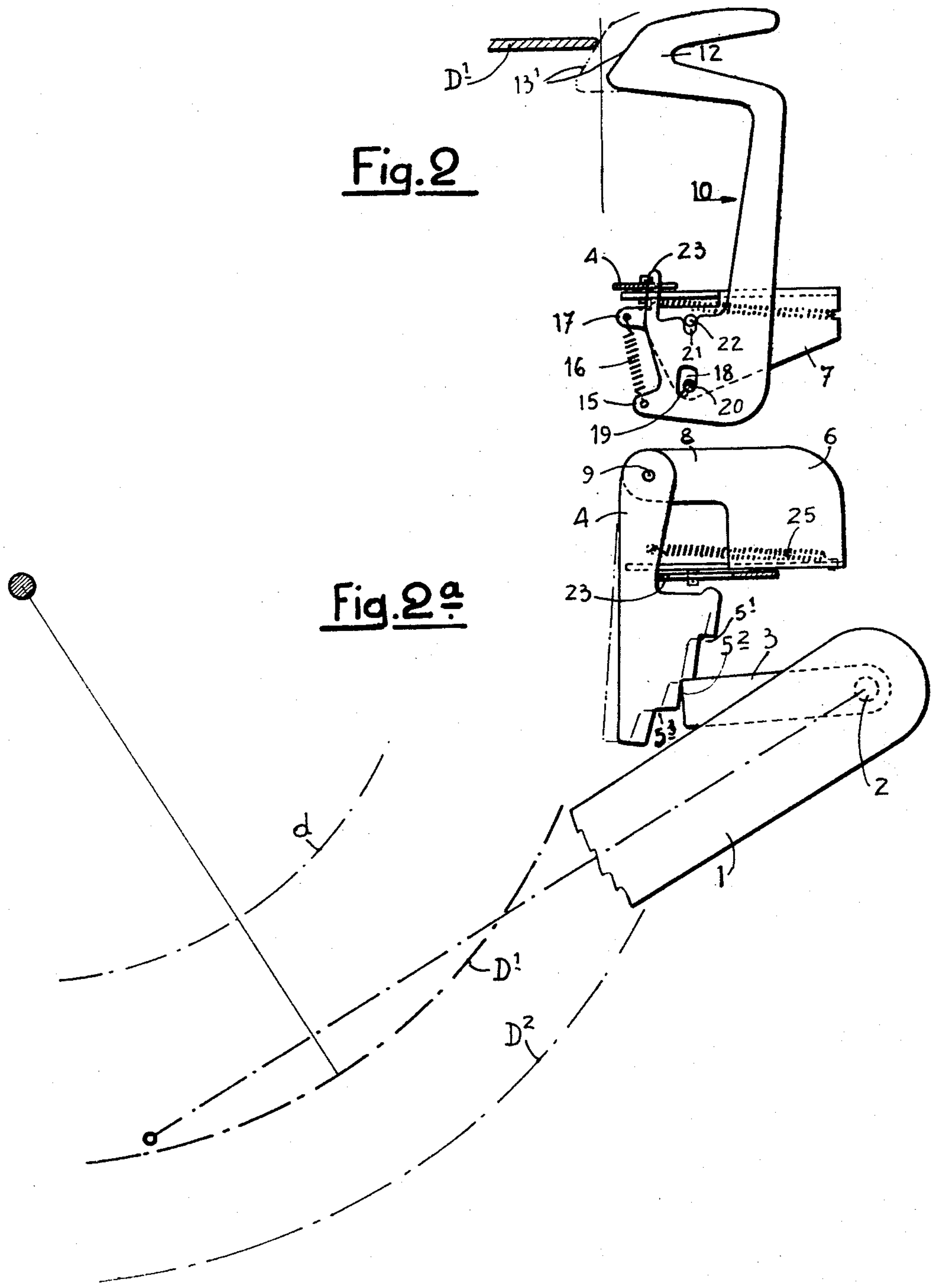
Figures 3, 3A:
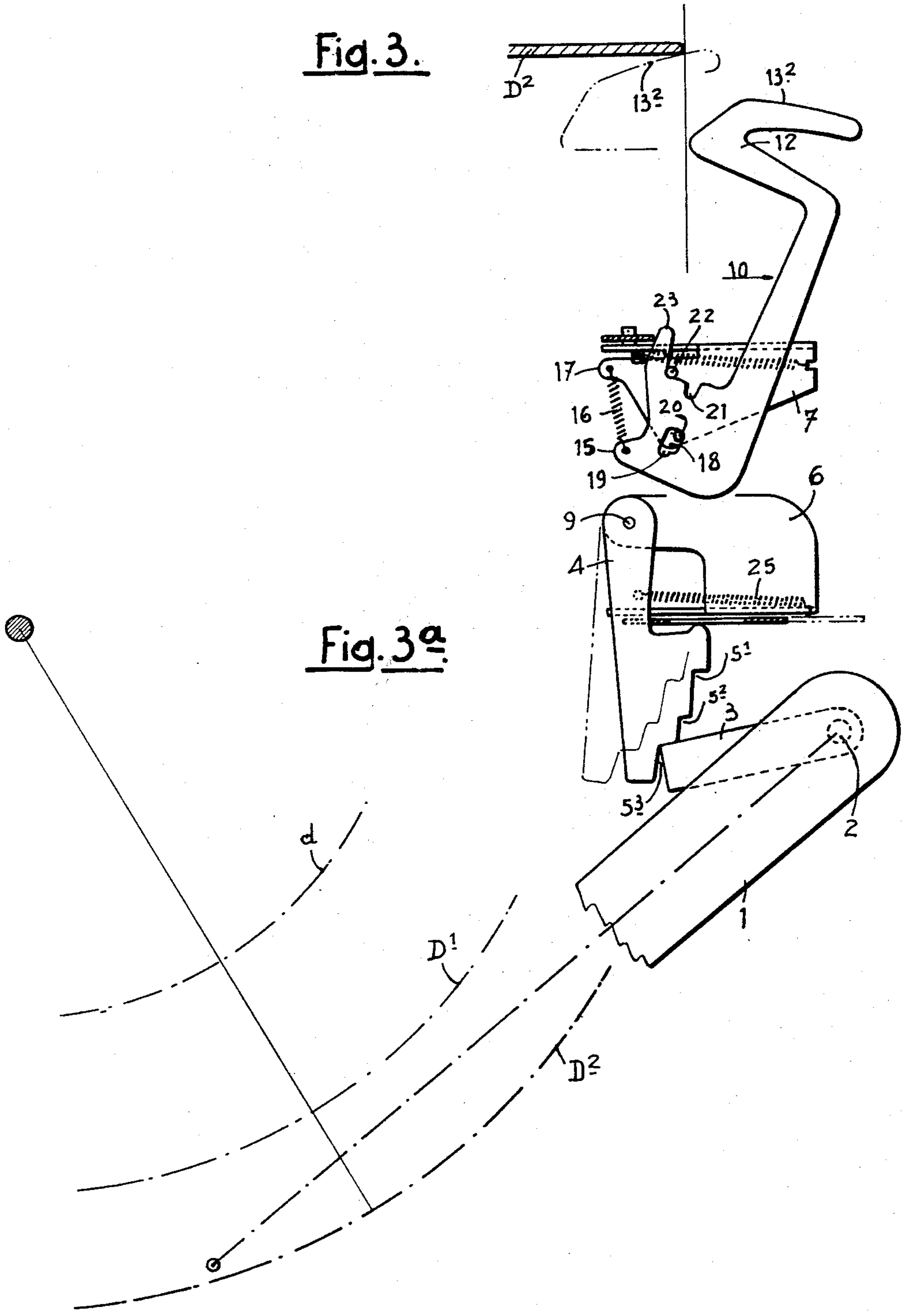
Figures 3B, 3C, 3D:
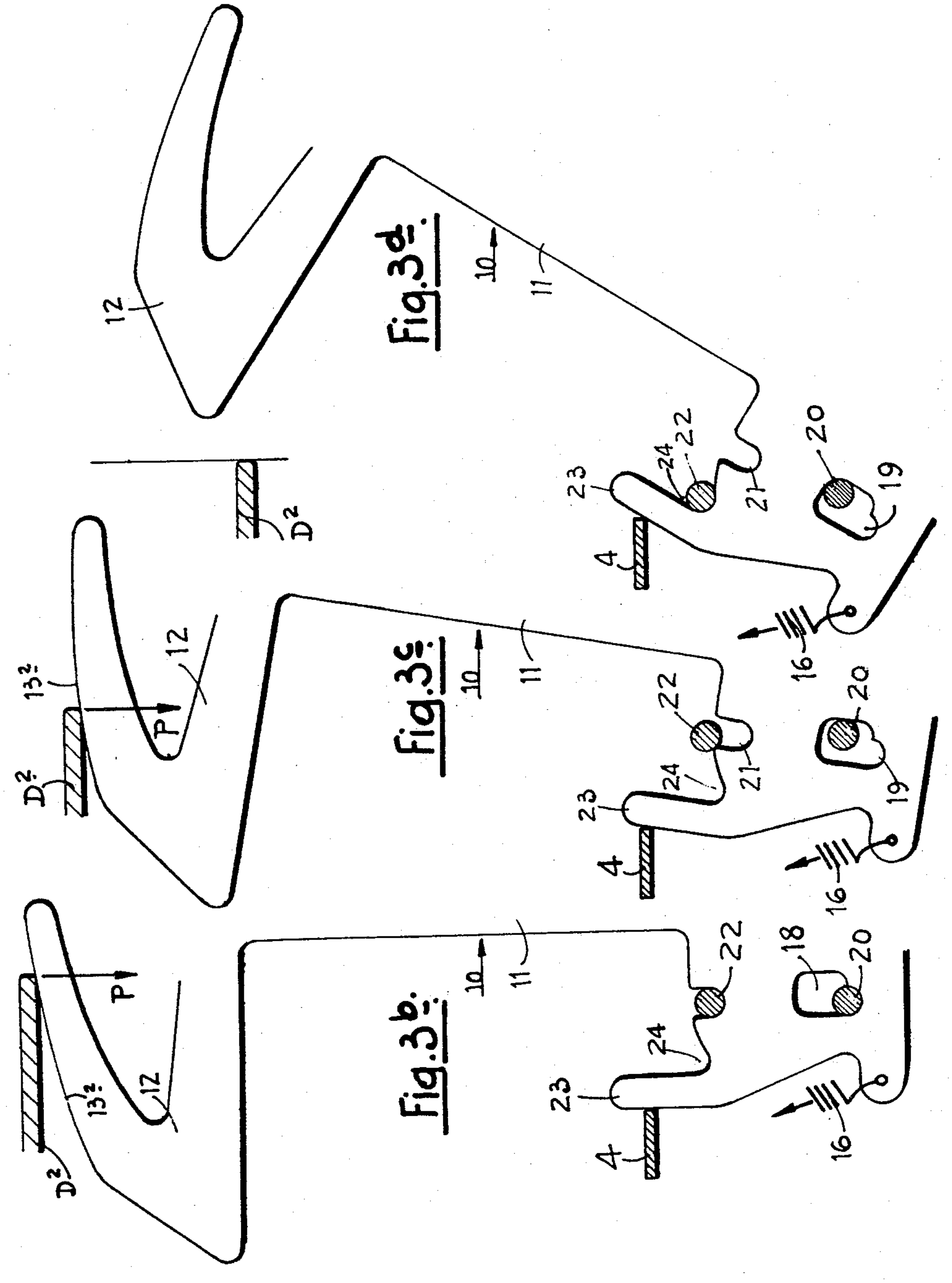
Figures 2B, 2C, 2D:
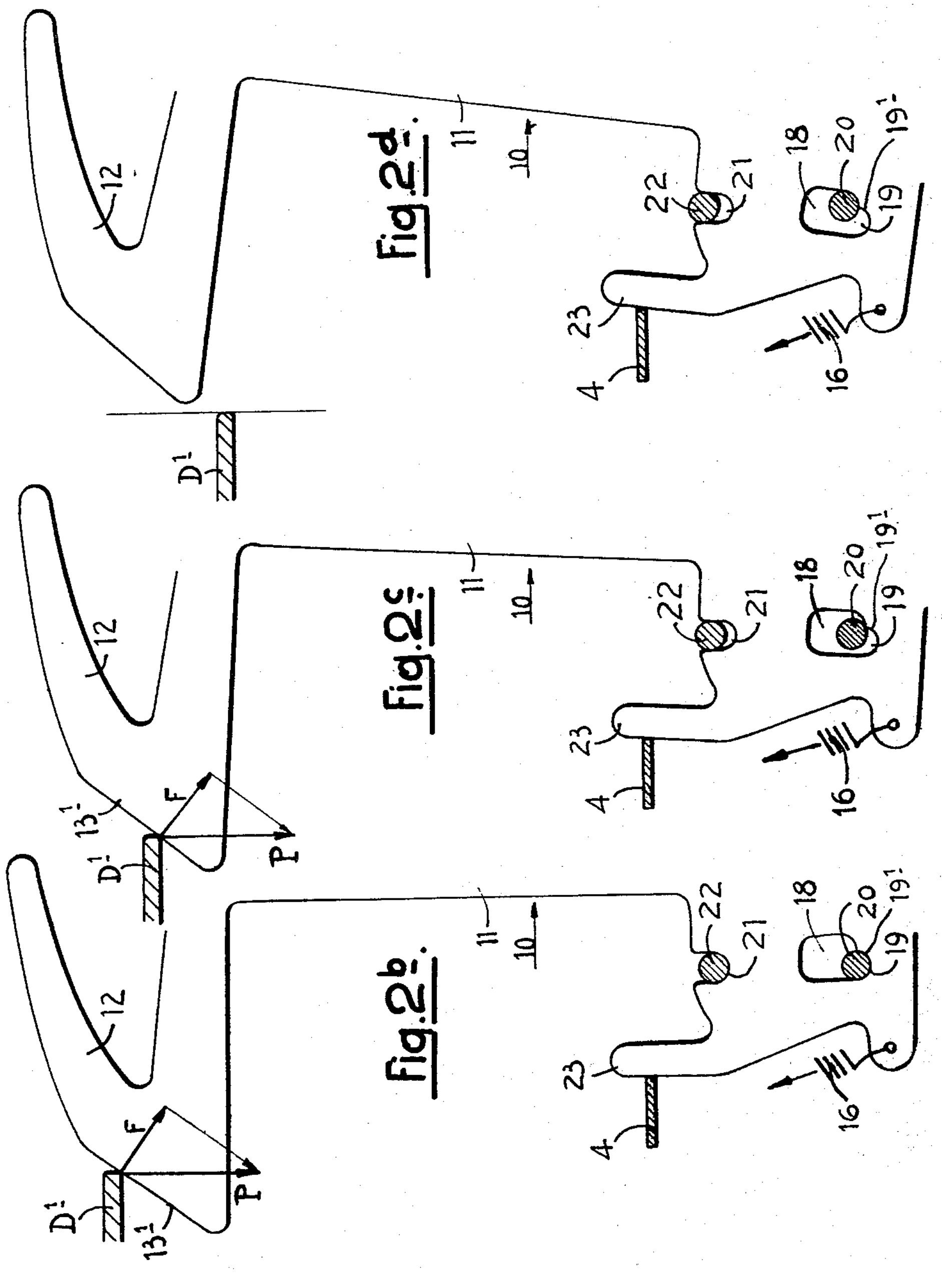

For a clear understanding of the invention and to show how the same may be carried into effect, reference is made to an embodiment which is illustrated in the accompanying drawings wherein;

FIGS. 1 and 1*a* show details of the construction of an embodiment of the invention showing the main elements and illustrating the manner of operation of the embodiment in the case of use with the smallest diameter record;

FIGS. 2 to 2*d* show the operation of the embodiment for a medium-diameter record, and FIGS. 3 to 3*d* show the operation of the embodiment for a large-diameter record.

Referring to the accompanying drawings, a pick-up arm 1 can pivot around a vertical spindle 2 to which is rigidly secured a lever 3- cooperating with a stop member 4 formed, on the side near the lever 3, with three recesses $5^1$, $5^2$, $5^3$. Secured to a frame (not shown) is an angle member having a flange 6 extending horizontally and a vertical flange 7. The flange 6 has a foot 8 formed with an aperture in which a spindle 9 supported by the lever 4 can rotate. A sensing element 10 comprises a vertical arm 11 having at its top a nose piece 12 having a ridge 13 adapted for engaging medium-diameter and large-diameter records to initiate an operation which will be described hereinafter. The element 10 is extended downwards by a plate 14 having, at the end of its bottom edge near the lever 4, a projection 15, secured to which is a spring 16 secured at its other end to a projection 17 of the flange 7. The plate 14 is provided with an aperture 18 which merges at the bottom into a recess 19 in which is engaged a pin 20 which is integral and extends from flange 7. Along the top edge of plate 14 there is formed a recess 21 adapted to receive a second pin 24 also integral and extends from flange 7. Along the top edge of plate 14 there is formed a recess 21 adapted to receive a second pin 24 also integral and extending from flange 7. At the end of plate 14, opposite the arm 11, there is formed a protuberance 23 which forms a tooth 24 and which is engageable with the stop number 4. A spring 25 has one end attached to the flange 7 and another end attached to the lever 4.

This system operates as follows:

Before a record is placed on the turntable, and while the pick-up arm is on one side, the automatic changer mechanism moves the detector-and-stop system into the position shown in FIG. 1 by known means. When a small-diameter record is positioned, as shown in FIG. 1, such record drops onto the turntable without touching element 10 in any way and therefore without changing the position thereof nor of the stop member 4 (FIG. 1*a*). When the pick-up arm is moved automatically into the positions from which it is to be lowered onto the record, the lever 3 rigidly secured to the vertical spindle abuts the recess $5^1$ in the stop member 4. By known means the stop member 4 is disengaged from the lever 3 before the pick-up arm descends onto the record.

When a medium-diameter record $D_1$ is positioned over the turntable (FIG. 2), such record engages against ridge 13 at inclined part $13^1$ thereof, to apply to nose piece 12 a lateral pressure developing a component of force F as seen in FIG. 2*b* and 2*c* to pivot sensing element 10 around pin 22; the pivoting movement of element 10 continues for as long as the record presses against the part $13^1$. During this pivoting, element 10 is also acted upon by pin 20 at the inclined surface $19^1$ formed in the recess 19. Consequently, element 10 is forced to pivot downwards slightly against the force of the spring 16 until the system has moved into the position shown in FIG. 2*d* where the bottom right-hand corner of the aperture 18 has engaged pin 20 to maintain, in cooperation with the spring 16, the element 10 in such position where it has pivoted enough to allow the record to drop onto the turntable without interference. During the tilting of element 10, the protuberance 23 which acts as an abutment for the lever 4 moves to the right in FIGS. 2*c* and 2*d* with element 10 and therefore causes the lever 4 to be pivoted by the action of spring 25 so that the recess $5^2$ in the lever 5 acts as an abutment for the lever 3 when the pick-up arm is moved into position for dropping onto the record.

When a large-diameter record $D_2$ is placed over the turntable, such record engages with an arcuate part 13[2] of the ridge of the nose piece 12 and the weight of the record (component P), causes lowering and pivoting of element 10 until the top edge of the aperture 18 engages with the pin 20, in which position the slot 21 is disengaged from the pin 22. As a result of the latter disengagement, the detector is pivoted by the spring 16 around the pin 20 until the tooth 24 abuts the pin 22, in which position the detector allows the record $D_2$ to drop without interference onto the turntable (FIG. 3*d*). During the tilting of the detector the protuberance 23 has been moved by spring 25 such that the lever 4 presents recess 5[3] as abutment to the lever 3 at the time when the pick-up arm is moved into the position for dropping onto the record.

What I claim is:

1. A record player of the type having a turntable, and a tone arm adapted to move to a preselected position on the turntable, the record player comprising a lever provided with a plurality of recesses each adapted for engaging the tone arm to restrict movement thereof to a different position, each recess corresponding to a different size record to allow the tone arm to be let down at the beginning of the different size records, a sensing element movably supported relative to said lever and including a protuberance normally engaging said lever to hold the same in a position whereat the tone arm will engage in a first recess corresponding to said preselected positions, said sensing element including a nose piece having different shaped surfaces each adapted to contact a record of different size as the records drop onto the turntable, each record exerting forces on the surface corresponding thereto which is different in direction from the forces exerted on the other surfaces, said sensing element undergoing different paths of movement in response to the forces exerted on the different surfaces whereby the protuberance of the sensing element moves to different positions for each record size, said lever following the movement of the protuberance such that a different recess is presented to the tone arm for each different size of record dropped on the turntable, a spring engaging said lever to urge the same into contact with the protuberance on the sensing element so that said lever follows the movements of said protuberance, said surfaces on said nose piece being two in number, one being straight, the other being curved, said curved surface causing a record to exert a substantially vertical force on said sensing element, said straight surface being inclined relative to the plane of said records so that a force having a substantial lateral component is developed on said sensing element when a record contacts the straight surface, said player further comprising a support having a pair of perpendicularly arranged flanges, said lever being supported on one of said flanges for pivotal movement, a pair of spaced pins on the other flange of the support, said sensing element including a plate having an elongated aperture formed therein and a groove adjacent said protuberance, said sensing element being supported on said support with a respective pin engaged in the groove and the aperture of the plate, said plate being movable relative to said support when a force is exerted on one of the surfaces of the nose pieces, said pins respectively sliding in the grooves and the aperture under the action of the forces to cause movement of said plate and protuberance.

2. A record player as claimed in claim 1 wherein a recess is formed in the aperture to provide an inclined surface in the aperture, said pins being respectively engaged in said groove and against said inclined surface in the aperture when a force is exerted on the straight surface of the nose piece to constitute a first limit position of rotation of the sensing element, the pin associated with the groove being displaced therefrom as said force is exerted on the curved surface of the nose piece, the latter said pin moving into a position engaged against the protuberance to provide a second limit position of rotation of the sensing element.

3. A record player as claimed in claim 2 comprising a second spring between said plate and said support exerting a force which tends to cause relative pivotal movement therebetween, said relative movement being resisted by the pin in the groove of the plate, said pin being released from said groove when the vertical force is applied to the sensing element to cause vertical displacement thereof, said second spring then causing pivotal movement of said plate to said second limit position.

4. In a record player having a tone arm adapted to be moved to a preselected position over a turntable and lowered onto a record on the turntable, the provision of a tone arm positioning device for records of first and second sizes comprising a sensing element including a vertical arm and a nosepiece extending therefrom, said nose piece including a ridge having a straight inclined surface adapted for being engaged by record of a first size which apply a lateral thrust to said sensing element, and an arcuate surface adapted for being engaged by records of a second size which apply a substantially vertical force on said sensing element, a lever provided with three recesses, said tone arm being adapted to cooperate with said recesses whereby said tone arm is limited in movement to a position corresponding to said first and second size records so that said tone arm will be lowered onto the records at the beginning thereof, a fixed support including a flange extending horizontally and a vertical flange, said lever being pivotally supported from said support, the sensing element including a plate, a spring having one end secured to said support and another to said plate, said plate being provided with an aperture and a merging recess to form an inclined surface, a pin on said vertical flange of the support engaged in said aperture, the plate being formed with a groove, a second pin on said vertical surface engaged in said groove, said plate including a protuberance the groove being located adjacent said protuberance, said sensing element rotating relative to said support against the action of said spring when a record of first size contacts the inclined surface of the ridge to a position whereat the pin in the aperture is supported on the inclined surface therein and said nose piece is moved to a position to allow the record to drop onto the turntable without interference, said sensing element being downwardly displaced when a record of second size contacts the arcuate surface until the plate at said aperture is in contact with said pin and said second pin is displaced from said groove whereby said spring exerts a force on said sensing element to cause pivoting movement thereof about the pin in the aperture to a limit position whereat the second pin engages the protuberance, said second size record being allowed to drop onto said turntable with the sensing element in the latter position.

References Cited by the Examiner

UNITED STATES PATENTS

| | | | |
|---|---|---|---|
| 2,794,647 | 6/57 | Guest | 274—10 |
| 2,823,039 | 2/58 | Collardo et al. | 274—10 |
| 2,825,570 | 3/58 | Guest | 274—10 |
| 2,868,547 | 1/59 | Vistain | 274—10 |
| 2,925,280 | 2/60 | Silbermann | 274—10 |
| 2,930,623 | 3/60 | Lee | 274—10 |

NORTON ANSHER, *Primary Examiner.*

NEWTON N. LOVEWELL, *Examiner.*